United States Patent [19]

Gurley

[11] Patent Number: 5,494,491

[45] Date of Patent: *Feb. 27, 1996

[54] INDIGO DYE PROCESS

[75] Inventor: Sally Gurley, Boulder, Colo.

[73] Assignee: Allegro Natural Dyes LLC, Longmont, Colo.

[*] Notice: The term of this patent shall not extend beyond the expiration date of Pat. No. 5,378,246.

[21] Appl. No.: 366,241

[22] Filed: Dec. 23, 1994

Related U.S. Application Data

[63] Continuation-in-part of Ser. No. 59,545, May 10, 1993, Pat. No. 5,378,246.

[51] Int. Cl.$^6$ .............................. C09B 67/00; D06P 1/34
[52] U.S. Cl. .................... 8/625; 8/631; 8/653; 8/918; 8/646
[58] Field of Search ................. 8/625, 653, 918, 8/631, 646

[56] References Cited

U.S. PATENT DOCUMENTS

| | | | |
|---|---|---|---|
| 678 | 4/1838 | Woodcroft | 8/653 |
| 5,378,246 | 1/1995 | Gurley | 8/625 |

*Primary Examiner*—Margaret Einsmann
*Attorney, Agent, or Firm*—Greenlee and Winner

[57] ABSTRACT

An improved nonpolluting method of dyeing fibers or fabric, including natural cellulose fibers such as cotton or linen, using indigo dye. The improved process preferably includes pretreating the fibers with a mordant solution, preferably a natural nonpolluting mordant solution. The fibers are then treated with a reduced indigo liquor in an inert atmosphere, preferably nitrogen. The indigo is then oxidized by flooding the dyed fabric with water. This indigo dye process can be adapted to conventional garment, package and piece dye processes and machinery, which has not been possible with existing indigo dye processes. The improved process results in a consistent and even dyed material which is color and washfast.

19 Claims, No Drawings

INDIGO DYE PROCESS

RELATED APPLICATIONS

This application is a continuation-in-part application of Ser. No. 08/059,545 filed May 10, 1993, now U.S. Pat. No. 5,378,246.

BACKGROUND OF THE INVENTION

This invention relates to improved processes for dyeing fibers with indigo dye, including natural cellulose fibers, textile fabric and yarn. The improved indigo dye processes may include premordanting the fibers and include oxidizing the leuco indigo dye by flooding the fibers with cold water, thus eliminating the requirement for skying and polluting effluents. Further, the indigo dye process of this invention can be adapted to utilize conventional garment, package and piece dye machinery and processes. The disclosed indigo dye processes are particularly but not exclusively adapted for dyeing natural fibers, including, for example, cotton, linen, wool, hemp, silk and blends of such fibers, but may also be used for synthetic fibers.

Indigo has been used to dye fabric with "indigo blue" since before recorded history. The sap which oozes from the plant when bruised was applied to fabric by ancient Egyptians, Greeks and Romans. Indigo has been used in India to dye fabric for at least 4,000 years by methods which are practically identical to methods employed today. Indigo was introduced in Europe in large quantities by the Dutch East India Company in the early 17th century.

Indigotin ($C_{16}H_{10}N_2O_2$) is the true coloring matter of indigo. When pure, indigotin forms a dark, rich blue powder or bronzy blue-colored needle crystals. The most important reaction of indigotin is its reaction with reducing agents. When subjected to a reducing agent in the presence of alkali, indigotin combines with two atoms of hydrogen and is reduced to a colorless body, known as indigo-white or the leuco form, which is insoluble in water, but dissolves in alkali, with a yellow color. This reaction may be represented, as follows:

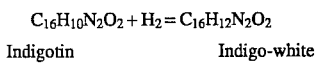

$$C_{16}H_{10}N_2O_2 + H_2 = C_{16}H_{12}N_2O_2$$

Indigotin          Indigo-white

It is reoxidized to indigotin with great ease, simply by exposure to oxygen, by the following equation:

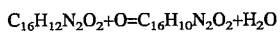

$$C_{16}H_{12}N_2O_2 + O = C_{16}H_{10}N_2O_2 + H_2O$$

The commercial vat method thus utilizes these reactions to dye fabric or yarn indigo blue. Commercial indigo vat dyeing is carried out in an aqueous alkali vat containing the reduced leuco form of indigo. Fibers in the form of warp yarns are dipped into the vat for a residence time sufficient to permit the fibers to absorb the desired amount of leuco dye. Following each dip, the fibers are squeezed between rolls and then carried into the open air, which is known as "skying," wherein the leuco dye is oxidized to the insoluble indigotin form in the fibers.

Oxidation of the reduced leuco form in the dip vat is troublesome in all vat dyeing, but is a particular problem with indigo dyeing. The oxidation occurs where the dye liquor contacts the air, especially in the region of the squeeze rolls where multiple interfaces are generated, exposing large areas of leuco dye liquor to the air as the dye liquor drains from the squeeze rollers. This oxidation results in a significant loss of dye liquor and formation of floating scum of oxidized insoluble dye. U.S. Pat. No. 4,283,198 discloses an "inert atmosphere" indigo dye process which includes an enclosure of the air-liquor interface of a leuco indigo bath comprising sodium hydrosulfite and sodium hydroxide, which results in consumption of oxygen at the enclosed interface. However, the enclosure cannot be gas tight and would not result in an inert gas enclosed process. Further, the process is impractical for commercial indigo dyeing operations and thus does not solve the problems associated with the use of natural indigo dyes.

Synthetic indigo has essentially replaced natural indigo in commercial dyeing. The production of synthetic indigo requires the use of toxic materials, including sodium cyanide, formaldehyde, sodium and potassium hydroxide and synthetically produced aniline, which are carded through to the cloth. The waste products include the unspent toxic chemicals described above, plus sulfuric and hydrochloric acid, sodium dioxide and insoluble salts. Thus, there has been a renewed interest in the use of natural indigo; however, the prior indigo dye methods result in dyed fibers or fabric which are not nearly as wash and lightfast as synthetic dyes, and naturally dyed colors are difficult to reproduce using known techniques. The processes of this invention may also be used with synthetic indigo.

Most textiles are dyed in batch processes, including stock, yarn, circular knits, woven fabrics, garments and the like. Batch methods include beck dyeing, package dyeing, skein dyeing, pad-batch, beam dyeing and others. The preferred dye machines and methods are generally dictated by the physical structure of the textile and the type(s) of fibers it contains. Commercial piece dyeing machines generally move the fabric through the dye liquor either under tension (jig) or relaxed (beck). The fabric can also be dyed in full length by winding the fabric on a perforated beam through which hot dye liquor is pumped. There are also pressure-jet dyeing machines which may include no moving parts, wherein dye liquor is pumped through specially designed Venturi jets imparting a driving force which moves the fabric through the machine. Combination machines are also available.

In a commercial piece dyeing machine, the fabric to be dyed is generally in the form of a seamed continuous loop of fabric, although the ends may be loose in certain machines. The width of the fabric may, for example, be 28 to 60 inches, and 50 to 1,000 pounds or more of fabric may be dyed in each batch. The fabric is continuously lifted or circulated out of the dye liquor, resulting in oxidation, pollution and uneven or inconsistent dyeing with the prior commercial processes.

Thus, there remains an important need for a process for dyeing fibers, particularly cellulose fibers, which is suitable for natural indigo and which produces a consistent natural color, which is wash and lightfast. The processes for dyeing textile fibers with indigo dye of this invention are suitable for natural indigo, thus avoiding the problems associated with synthetic indigo dyes, including toxic wastes. The processes of this invention may also be utilized to dye over other colors, producing a full palette of consistently reproducible natural colors which are wash and lightfast.

SUMMARY OF THE INVENTION

The improved processes for dyeing textile fibers with indigo dye of this invention are suitable for dyeing natural cellulose fibers, including, for example, cotton and linen fabrics, wool, hemp, silk, and synthetic fibers and textiles, including, for example, Rayon® and Tensel™. The indigo dye processes of this invention are particularly, but not exclusively, adapted for use with natural indigo dye while avoiding many of the problems associated with the use of vegetable dyes, and result in reproducible colors which are wash and lightfast. The processes of this invention preferably include pretreating the fibers, which may be in the form of yarn, fabric or a garment, with a mordant solution, although pretreatment or premordanting is not required. It will be understood by those skilled in the art, that premordanting is not presently used for indigo dyeing. In the most preferred processes of this invention, particularly where indigo is used with other dyes, a natural nonpolluting mordant solution may be utilized, such as the aqueous suspension of alum and soda ash disclosed in my copending application for U.S. Ser. No. 08/059,544, filed May 10, 1993, now U.S. Pat. No. 5,403,362, the disclosure of which is incorporated herein by reference.

After the fibers are wetted out and drained, the fibers are placed in a contained inert atmosphere, which is substantially free of oxygen. In one preferred embodiment of the invention, the fibers are placed within an enclosure which is flooded with nitrogen gas under pressure, displacing oxygen from the fibers and the enclosure. As used herein, "inert atmosphere" refers to an atmosphere which is "inert" to the chemical process carried out in the enclosure, which is substantially free of oxygen. Nitrogen or other relatively inert gases may be used alone or in combination with a reducing gas. The fibers are then treated with an aqueous indigo dye liquor containing indigo in the reduced leuco state in the contained inert atmosphere. The fibers are agitated in the reduced indigo dye liquor, such that the fibers to be dyed are saturated with the reduced indigo. Finally, after draining the aqueous solution of indigo dye where the fibers are submerged, the fibers are flooded with water, wherein the indigo blue or indigotin is regenerated in and upon the fibers, which then become permanently dyed. The treatment of the fibers with indigo may be repeated several times to produce the desired intensity of indigo blue.

The indigo dye liquor is preferably introduced into the contained indigo dye vat or tank from a holding tank after the fibers are flooded with inert gas and stripped of oxygen, as described above. The holding tank is prepared by filling the tank with water, then stripping the water in the holding tank of oxygen by adding sodium hydrosulfite to the water, and then introducing indigo dye liquor in the reduced leuco state, preferably below the surface of the water in the tank. A conventional floating cover may be used on the holding tank or the tank is enclosed to prevent oxidation of the reduced indigo. The reduced indigo dye liquor may be made by conventional processes, wherein indigotin or indigo blue concentrate is added to a weak aqueous solution of sodium hydroxide which includes a reducing agent, such as sodium hydrosulfite.

Where pretreatment of the fibers is used, the pretreatment is preferably carried out using an aqueous solution of a natural nonpolluting mordant solution. The most preferred mordant solution comprises an aqueous suspension of alum or potassium aluminum sulfate $(KAl(SO_4)_2.12H_2O)$ and soda ash $(Na_2CO_3)$. As described more fully in my above-referenced copending U.S. patent application, the natural mordant solution is preferably prepared by adding alum to an aqueous solution of soda ash in water, which is then agitated and heated to a temperature of about 150° F. This forms an aqueous colloidal suspension of aluminum hydroxide and alum. The pretreatment of the fibers with this nonpolluting aqueous mordant solution results in improved dyed fibers, particularly with natural indigo dye, as described herein.

Where the indigo dye process of this invention is used to dye fibers or fabric in a commercial piece dye machine, it is not practical to repeatedly drain the machine during the dye process, but the process can easily be adapted to such machines. Commercial piece dye machines are enclosed, but not airtight. The fabric, which is generally in the form of a continuous loop of fabric, as described above, is placed in the machine and water is added to the dye tank. Generally, tap water is used and therefore the water is preferably heated in the tank to about 100° F. The reduced indigo dye liquor may be prepared, as described above, in an add tank or pump cart which is connected to the dye tank by lines or hoses. Sodium hydrosulfite is added to the water in the pump cart to strip oxygen from the water and this reduced water is circulated through the lines to clear and flush the lines. The enclosed piece dye machine is flooded with nitrogen or other inert gas while the fabric is agitated and circulated in the machine to maintain an inert or nonoxidizing atmosphere in the machine enclosure and strip oxygen from the fabric.

The reduced indigo dye liquor in the leuco state is then pumped from the pump cart to the dye tank of the machine, preferably below the water level of the dye tank, while maintaining the nonoxidizing atmosphere, and the machine continues to agitate and lift the fabric. As described, it is very important to control the rate of oxidation of the indigo dye. This is accomplished in the preferred method of this invention by first turning off the nitrogen supply to the machine for a few minutes, which begins the oxidation process. The machine is then drained as quickly as possible and the fabric is then flooded with water, completing the oxidation process, as described above, and the fabric may be agitated in the machine. Finally, the dyed fabric is removed from the machine by conventional means.

Commercial package dye machines are used to dye yarn and include one or more, generally a plurality, of perforated stainless steel tubes which are received on mandrels enclosed in a package kier. The yarn to be dyed is spirally wound on the tubes and the dye liquor is repeatedly pumped through the yarn, into and out of the tubes, which are submerged in the dye liquor. At present, yarn is not dyed with indigo in package dye machines because the indigo dye uptake on the yarn is not sufficient or consistent.

The improved process for dyeing textile fibers with indigo of this invention produces permanently dyed fibers and fabrics or textiles which are light and washfast, and produces reproducible natural colors. As described, the use of natural indigo substantially reduces the use of toxic chemicals and waste. Thus, the natural indigo dye process of this invention solves many of the problems associated with synthetic dyes. As described more fully herein, the indigo dye process of this invention may be used to dye fibers with natural indigo dyes using conventional package and garment dye processes and machinery. Further, the indigo dye processes of this invention avoid the problems associated with indigo vat and piece dyeing. Finally, the processes of this invention may be utilized to dye cellulose fibers with indigo, including cotton and linen which have been found to be particularly difficult to dye with natural dyes by the textile industry using conventional processes. The dye processes of this invention may also be used to dye wool, hemp, silk and synthetic fibers, as described above. Other advantages and meritorious features of this invention will be more fully understood from the following description of the preferred embodiments of the indigo dye process of this invention which follows, and the appended claims.

DETAILED DESCRIPTION OF PREFERRED INDIGO DYE PROCESS

As described above, the indigo dye processes of this invention are particularly, but not exclusively, adapted for dyeing natural cellulose fibers, including cotton and linen. The principal commercial use of indigo dye at present is dyeing denim yarn for jeans. Denim is a double twilled cotton fabric; however, it is not possible to dye cotton fabric with indigo using existing processes. Instead, cotton yarn is dyed with indigo in a vat process, as described above.

The indigo dye processes of this invention may be easily adapted to dye yarn or fabric using conventional garment, package and piece dye equipment and processes. This has not been commercially feasible with existing indigo dye processes. In a package dye apparatus, for example, the yarn is wound on perforated stainless steel tubes to form a cone of continuous yarn. An aqueous solution of synthetic dye liquor is then forced under pressure into and out of the porous tube and out through the yarn cone. This important commercial package dye process has, however, been limited to synthetic dyes because indigo dye does not have sufficient uptake to dye the yarn in the cone, and present processes require skying, as described above. Similarly, conventional commercial garment dye equipment and processes are not suitable for indigo dyes. There is also disclosed herein a specific adaptation of the indigo dye process of this invention to commercial piece dye machines and package dye machines.

In most applications, the preferred indigo dye process of this invention includes pretreatment of the fibers with a nonpolluting aqueous mordant solution (premordanting), but premordanting is not required. As will be understood by those skilled in the art, the present indigo dye processes do not use mordants and the yarn is not pretreated for dye uptake. The most preferred mordant for the indigo dye process of this invention is an aqueous solution of alum or potassium aluminum sulfate $KAl(SO_4)_2.12H_2O$ and soda ash $(Na_2CO_3)$. Although it is believed that other mordant solutions may be used to pretreat the fibers using the indigo dye process of this invention, this mordant solution has been found to be particularly advantageous with the processes of this invention. The most preferred mordant solution comprises a colloidal suspension of aluminum hydroxide in aqueous solution, wherein the concentration of alum is about seven times the concentration of soda ash, in weight percent. The preferred colloidal suspension of aluminum hydroxide may be formed by adding alum slowly to an aqueous solution of soda ash while agitating the solution, then heating the solution to about 150° F. to 180° F.

The fibers to be dyed are then pretreated with the mordant solution by immersing the fibers in the mordant solution, preferably at a temperature of about 100° to 190° F. for about an hour. The fibers may be in the form of a yarn, as in the present indigo processes, or the fibers may be in the form of a garment, such as a shirt, dress or a pair of jeans, textile fabric, or the fibers may be wound on a porous mandrel, such as used in a package dye machine. In the most preferred method of pretreating the fibers, the fibers are treated in temperature stages, first at a lower temperature of, for example, about 120° F. for about 20 minutes, then at a higher temperature of about 140° F. for about ten minutes. The solution is then heated to about 165° F. to 180° F. and the fibers are agitated for about 45 minutes. It has been found that this staged pretreatment process results in greater dye uptake. Following the premordanting, the fibers are then rinsed thoroughly and preferably dried.

The fibers are then dyed with indigo dye using the indigo dye process of this invention. The fibers are preferably dyed in a sealed or contained atmosphere because the fibers are preferably dyed in an inert or nonoxidizing atmosphere which functionally removes oxygen from the fibers. A sealed atmosphere for the purposes of the indigo dye process of this invention can be obtained using a commercial or industrial washing machine or commercial dye machine which has a controlled atmosphere. As will be understood, however, such commercial washing or dye machines generally do not have a totally sealed chamber, which is not required for the indigo dye processes of this invention. It is possible, however, to dye the fibers in an inert atmosphere using commercially available industrial washing and dye machines by flooding the fibers with an inert or nonoxidizing gas and maintaining a slight pressure of an inert gas, such as nitrogen. A computer controlled system, wherein the liquid and gas influents, temperature and agitation cycles can be preprogrammed and controlled is also preferred, but not required. A suitable industrial washer which may be utilized for the indigo dye process of this invention is the Unimac Washer Extractor of Unimac Corp.

The indigo dye liquor is preferably introduced into the contained inert atmosphere containing the fibers from a holding tank. The indigo holding tank includes water and indigo dye in the reduced leuco state, as described above. The indigo dye holding tank may be prepared by filling the tank with water, then stripping the oxygen from the water by adding a reducing agent such as sodium hydrosulfite $(Na_2S_2O_4)$. The reduced indigo is then introduced into the holding tank preferably below the surface of the water. The reduced indigo dye liquor may be prepared by conventional methods, generally as follows. The indigotin or indigo blue concentrate is added to a weak aqueous solution of sodium hydroxide which has been treated with a reducing agent such as sodium hydrosulfite. The indigotin is thus reduced to indigo white or the reduced leuco state, as described above. The holding tank is thus ready for introduction into the process, as now described.

In one preferred embodiment of the method of this invention, the fibers to be dyed are preferably first wetted out. This can be accomplished by rinsing the fibers in warm water preferably containing a wetting agent, such as "Ecowet" wetting solution available from Southeast Chemical Corp. The wetting solution may also contain sodium hydrosulfite, but an oxygen stripping agent is not required. The wet fibers are then flooded with an inert gas, such as nitrogen, to strip oxygen from the fibers and contain the fibers in an inert atmosphere as described. Where the fibers are dyed in an industrial washer for example, as described above, a nitrogen pressure of about 5 psi over atmospheric pressure is maintained to maintain the fibers in an inert atmosphere. The content of the indigo dye holding tank is then introduced into the dye chamber and the fibers are agitated in the controlled inert atmosphere. In a typical application, the fibers are agitated at a temperature of about 100° F. for about 10 minutes or sufficient time for the fibers to take up the indigo dye. If the fibers are not premordanted, the dye uptake may be reduced. Further, the dyed fibers will not be as lightfast. The dye liquor is then drained while maintaining the inert atmosphere, as described.

Finally, the reduced indigo dye is oxidized in the process of this invention by flooding the fibers with water. Cold tap water having a temperature of less than about 90° F. or about 60° to 90° F. has been found to be very suitable for the oxidation step. Cold water is added to cover the fibers and the fibers are agitated for about 15 minutes or a time sufficient to fully oxidize the reduced indigo to the indigotin state, as described above. The method of this invention thus eliminates the skying step, which has been a problem with commercial indigo vat dyeing processes and permits the use of the indigo dye process of this invention in commercial package, garment and piece dye machinery.

As described more fully below, the indigo dye processes of this invention may also be used to dye yarn with indigo in commercial package dye machines, which has not been commercially feasible with conventional processes. Where premordanting is used, which is preferred in some applications, the premordanting may be performed in the package dye machine. As described, the yarn to be dyed is spirally wound on perforated stainless steel tubes which are generally submerged in an enclosed kier. The machine is designed to repeatedly sequentially pump liquid (dye liquor) into and out of the tubes through the cones of yarn. The yarn may be premordanted by placing the perforated tubes containing the yarn to be dyed in the package kier and filling the package kier with water, which is preferably heated to the desired temperature of about 100° F. The premordant is then added to the water either as a prepared solution or suspension and the premordant is then pumped through the yarn at a temperature of 100° to 180° F. by operation of the package dye machine, wherein the premordant is pumped into and out of the perforated tubes, through the yarn wound on the tubes preferably at a temperature of 100° to 180° F. The yarn may then be rinsed by pumping warm (e.g. 100° F.) rinse water through the tubes, as described. An aqueous solution of reduced indigo dye, which may be prepared as described above, is then forced through the tubes and the yarn wound on the tubes while maintaining the package kier in a nonoxidizing atmosphere, as described. Finally, water is pumped under pressure through the tubes to oxidize the indigo dye on the fibers of the yarn, permanently dyeing the yarn with indigo dye.

The indigo dye process of this invention may be repeated to increase the dye uptake on the fibers and produce a deeper shade of blue. That is, the dyed fibers are again treated with indigo dye in the reduced leuco state in an inert atmosphere, as described above. The fibers are then washed in water to oxidize the reduced leuco indigo to indigotin, forming a deeper shade on the fibers. As will be understood by those skilled in the art, indigo dye is very important not only to produce a blue color, but also for various shades of purple, gray, browns and even black. The indigo dye process of this invention is suitable for "natural" indigo derived from indigo plant material, but also for genetically produced indigo available from Genencor Corp., or synthetic indigo.

The indigo dye process of this invention has also been adapted for use with conventional commercial piece dye machines, as described above. The fabric to be dyed, which may be premordanted as described, is first placed in the dye tank of the piece dye machine. In most applications, the ends of the elongated fabric strip to be dyed are sewn together to form a continuous loop and the fabric loop is conventionally placed on rollers either under tension (jig) or relaxed (beck), as will be understood by those skilled in the art. In a pressure piece dye machine, the fabric strip may be received loosely in the dye tank of the machine. Water is then added to the dye tank. As described above, the dye tank and the area immediately above the tank of commercial piece dye machines are enclosed and relatively sealed; however, commercial piece dye machines are not airtight. If tap water is used, the water is preferably heated to the desired temperature of about 100° F.

The indigo dye liquor is prepared in a separate holding tank, which may be a conventional enclosed add tank or pump cart which is connected to the dye tank of the piece dye machine by lines or hoses. As described above, water is added to the holding tank, then oxygen is stripped from the water by adding sodium hydrosulfite. The amount of sodium hydrosulfite required will depend upon the process and the fabric to be dyed, but generally varies between 0.25 grams per gallon to 1.75 grams per gallon. A small amount of the water in the holding tank which has been stripped of oxygen is then circulated to the dye tank of the piece dye machine to flush the lines. Finally, reduced indigo or indigo in the leuco state is added to the holding tank for use in dyeing the fabric in the dye tank of the machine. As described above, the reduced indigo may be prepared by conventional means, wherein indigotin or indigo blue concentrate is added to an aqueous solution of sodium hydroxide which has been treated with a reducing agent, such as sodium hydrosulfite. The amount of indigo stock will depend upon the color formula and is preferably added to the holding tank below the surface of the tank and the tank is enclosed, as set forth above.

An inert or nonoxidizing gas, such as nitrogen, is then introduced into the piece dye machine under pressure as described above, while the machine is operating. The fabric loop is thus agitated and circulated continuously in and out of the dye tank in the nitrogen atmosphere which strips oxygen from the fabric and the dye tank. In a conventional commercial piece dye machine, this step is completed within about 15 minutes. The reduced indigo dye is then introduced into the dye tank from the holding tank, preferably below the level of the surface of the dye tank while maintaining the nonoxidizing atmosphere in the piece dye machine. As described above, the inert or nonoxidizing atmosphere can be maintained in the piece dye machine by maintaining a slight pressure of the nonoxidizing gas, preferably nitrogen. The fabric is thus circulated in the reduced indigo dye liquor by the machine in an inert or nonoxidizing atmosphere for a time sufficient to color the fabric as required by the dye formula. In a typical application, the time required will be 5 to 20 minutes depending upon the fabric to be dyed and the dye process used by the piece dye machine.

It is very important to control the rate of oxidation of the reduced indigo dye on the fabric fibers in a commercial piece dye machine to obtain uniform dyeing of the fabric. As described above, the fabric, which is generally in the form of a fabric loop weighing as much as 1,000 pounds or more, is circulated continuously in the dye tank in and out of the dye liquor. In a preferred method of this invention, oxidation begins by turning off the flow of nitrogen gas, which permits a small amount of oxygen to enter the enclosure above the dye tank. The machine continues to operate for a few minutes (e.g. 5 to 15 minutes) and the tank is then drained as quickly as possible, shutting down the machine. The fabric in the dye tank is then flooded with water, completing the oxidation of the indigo on the fibers of the fabric as described above. Tap water may be used, provided the temperature is less than about 90° F. or generally between about 60° F. and 90° F. The fabric may be circulated in the water by the piece dye machine for a time sufficient to thoroughly oxidize the indigo dye, and the fabric is removed from the dye tank by conventional means. In a conventional piece dye process, the fabric loop is cut and an end is placed on a roller which removes the fabric from the piece dye machine. The fabric is then circulated to extractors which extract the excess dye liquor, cleaned and dried. Further details of the use of the indigo dye process of this invention will be understood by those skilled in the art of piece dye machines and piece dyeing.

As described above, the indigo dye processes of this invention are also suitable for dyeing natural yarns in conventional package dye machines. Prior to this invention, it was not possible to dye yarn with indigo in a conventional package dye machine. In a commercial package dye process, the yarn is wound onto perforated stainless steel dye tubes which are placed on spindles that are fitted in a closed package kier. The dye solution or dye liquor is pumped into and out of the perforated tubes, through the spaced holes in the tubes, and through the yarn wound on the tubes. Precision winding of the yarn on the tubes provides improved quality of dyeing by giving a more uniform yarn density.

The process of indigo dyeing of this invention in a conventional package dye machine then includes winding the yarn to be dyed on a conventional package dye perforated tube. In a conventional commercial package dye machine, several wound tubes or cones of yarn are dyed at one time. In the most preferred method of this invention, the cones of yarn are first pretreated by pumping a premordant solution through the tubes and the yarn wound on the tubes, as described above, although premordanting is not required. Further, as set forth above, premordanting was not previously used with indigo dyeing. Premordanting may be accomplished in a package dye machine by pumping a warm premordanting solution through the perforated die tube, which is then forced through the yarn wound on the tube. The tubes of yarn are submerged in the premordant solution and the premordant is sequentially pumped into and out of the perforated tubes through the yarn wound on the tubes, followed by rinsing, as described above. In the most preferred method of this invention, the mordant is an aqueous suspension of alum or potassium aluminum sulfate and soda ash, preferably a colloidal suspension of alum and aluminum hydroxide in aqueous medium, wherein the concentration of alum is about seven times the concentration of soda ash, in weight percent. The premordanting solution is preferably heated to 100° to 180° F. and the premordanting solution is pumped through the yarn for 10 minutes to about 1 hour. It will be understood, however, that premordanting will not be required for applications of indigo, particularly in package dye machines.

A conventional package dye machine includes at least two enclosures or "kiers", including a dye kier which receives the dye stock and a package kier having mandrels which receive the tubes of yarn to be dyed. The method then includes preparing the indigo stock in a separate holding tank. The enclosed dye kier of the package machine is then filled with water and a reducing agent, such as sodium hydrosulfite, is added to the dye tank to remove oxygen. The indigo dye stock is then added preferably below the level of the water. The enclosed package kier of the package dye machine which contains the yarn to be dyed is then filled with a nonoxidizing gas, preferably nitrogen, which is pumped into the package kier to maintain a nonoxidizing or inert atmosphere, as described above. In the most preferred method, nitrogen gas may be circulated through the perforated tubes and the yarn on the tubes to strip oxygen from the yarn.

The reduced indigo dye liquor is then pumped from the dye kier to the package kier of the package dye machine, through the perforated tubes and through the yarn wound on the tubes, while maintaining the inert or nonoxidizing atmosphere in the enclosed package kier. In a conventional package dye machine, the tubes are submerged in the dye liquor and the dye liquor is sequentially pumped into and out of the dye tubes. The time required for dyeing the yarn on the tubes will depend upon the particular package dye machine and the yarn; however, the dye process will generally take from 5 to 20 minutes.

The indigo dye is then oxidized preferably by first turning off the flow of nitrogen to the enclosed package kier for a few minutes followed by pumping water through the tubes and the yarn wound on the tubes. Where the tubes of yarn are submerged, the dye liquor is first drained from the package kier. The dyed yarn is then processed by conventional means used in package dyeing. Further details regarding package dyeing will be understood by those skilled in the art of package dyeing from the several publications relating to package dyeing.

Having described the indigo dye processes of this invention, the following is an example of an application of this process used in dyeing garments, namely men's and women's shirts and women's dresses made of cotton fiber. First, a premordant was made for pretreating the fibers, as described above. A quantity of premordant was prepared for treating 9,100 gms of cotton textile fiber (about 20 pounds). First, a solution of soda ash in water was prepared which contained 2% of the weight of the fibers to be treated of soda ash (182 gms). The soda ash was added to 5 gallons of warm water and the water was stirred to dissolve all of the soda ash. As used herein, warm water has a temperature of about 80° to 100° F. 15% of the weight of the fibers of powdered alum (1,365 gms, about 3 pounds) was then added slowly to the aqueous solution of soda ash. The alum must be added slowly to avoid flashing, although the solution will foam as the alum is added. The solution was then heated to a temperature of about 150° F. while the solution was stirred or agitated. A colloidal suspension of aluminum hydroxide begins to form at a temperature of about 140° F. The mordant solution was now ready for use in pretreating the fibers.

Twenty pounds of cotton garments to be dyed were then placed in an industrial "Unimac Washer Extractor" and the fibers were thoroughly wetted out with warm water containing 40 ml "Ecowet" commercial wetting agent. One-half of the premordant solution was then added and the solution was heated to 120° F. and agitated for about 10 minutes. The remainder of the mordant solution was then added and the temperature was raised to 140° F. and agitation continued for 10 minutes. The temperature was then raised to 165° F. and agitation continued for 45 minutes. The temperature was then reduced to 120° F., the mordant solution was drained, and the garments were thoroughly rinsed with warm water, drained and dried using the dry cycle of the industrial washer.

The pretreated or premordanted cotton fabric was now ready for dyeing with indigo dye. The indigo dye holding tank was then prepared by adding 40 gallons of warm water to the tank. 24 gms of sodium hydrosulfite was then added to the water to strip oxygen from the water. 1.5 gallons of indigo dye stock in the reduced leuco state was then added to the holding tank below the surface of the liquid in the tank. As described above, the reduced indigo dye stock may be produced by conventional methods, wherein commercially available liquid indigotin is added to a weak aqueous solution of sodium hydroxide and a reducing agent.

The 20 pounds of pretreated cotton garments were then wetted out with warm water containing about 30 ml of "Ecowet" commercial wetting solution. Following draining of the wetting solution, the fibers were agitated and the chamber was flooded with nitrogen for a few minutes to remove oxygen from the chamber and the cotton garments. As described, the process of this example was conducted in a Unimac Washer Extractor having a drum rotatable on a horizontal axis to agitate the fibers or garments.

The content of the indigo holding tank was then emptied into the chamber and the garments were agitated for about 6 minutes with gas and about 4 minutes without gas in the aqueous solution of reduced indigo dye in the contained inert atmosphere. The aqueous indigo dye solution was then drained and the chamber was immediately filled with water and agitated for about 10 minutes to oxidize the indigo, as described above. The indigo dye process was then repeated to produce a natural indigo blue of the desired shade.

The indigo dye fabrics and yarn produced by the indigo dye processes of this invention are both light and washfast. The American Association of Textile Colorists and Chemists has developed standard Lightfast and Washfast tests for comparison of dyes and dye processes. Fabrics and yarns dyed by the indigo dye process of this invention rated about 4.5 to 5 out of a possible 5 in such tests. Thus, fabrics dyed by the indigo dye process of this invention compare very favorably to fabrics dyed using synthetic dyes, and the process is suitable for commercial application. Further, the indigo dye process of this invention does not produce toxic or polluting effluents, which is a serious problem with synthetic dyes and existing commercial indigo processes. Finally, the indigo dye process of this invention requires significantly less heat energy than conventional processes, making the indigo dye process of this invention environmentally sound.

As will now be understood by those skilled in the art, various modifications may be made to the indigo dye process of this invention within the purview of the appended claims. For example, the method of this invention is not limited to premordanting or the disclosed premordant solution, which is, however, preferred. Further, the mordant may be added directly to the tank containing the fibers or fabric and water, preferably by first adding alum followed by the soda ash. That is, it is not necessary to make up the mordant suspension separately in a container and then add the mordant suspension to the fabric and water. Further, other inert gases may be used to prevent oxidation of the reduced indigo in the dye tank, package kier or chamber. However, nitrogen is relatively inexpensive and nonpolluting. Finally, the indigo dye process of this invention may be used to produce a wide variety of hues or colors, particularly when used in combination with other dyes.

Having described the indigo dye process of this invention, the invention is now claimed as follows:

1. A method of dyeing fabric with indigo dye in a conventional piece dye machine, said piece dye machine including a dye tank within a contained enclosure and means for continuously moving the fabric into and out of the dye tank within said enclosure, said method comprising the following steps:

(a) placing the fabric to be dyed within said dye tank of said piece dye machine and adding water to said dye tank to at least partially cover said fabric;

(b) displacing oxygen from said contained enclosure of said piece dye machine with an inert or non-oxidizing gas creating an atmosphere within said enclosure which is substantially free of oxygen;

(c) introducing an indigo dye liquor containing indigo in its reduced leuco state into said dye tank and agitating said fabric within said contained enclosure while maintaining said enclosure substantially free of oxygen; and (d) oxidizing said indigo dye on said fabric and thereby permanently dyeing said fabric with indigo dye.

2. The method of dyeing fabric with an indigo dye as defined in claim 1, wherein said method includes introducing a non-oxidizing gas under pressure into said enclosure, thereby displacing oxygen from said enclosure as set forth in step (b), and agitating and lifting said fabric in said dye tank and enclosure to displace oxygen from said fabric.

3. The method of dyeing fabric with an indigo dye as defined in claim 2, wherein said method includes introducing nitrogen gas under pressure into said contained enclosure while agitating said fabric.

4. The method of dyeing fabric with an indigo dye as defined in claim 1, wherein said method includes draining said dye liquor from said dye tank before oxidizing as set forth in step (d).

5. The method of dyeing fabric with an indigo dye as defined in claim 1, wherein said method includes introducing an inert gas under pressure into said contained enclosure of said piece dye machine to displace oxygen from said enclosure as set forth in step (b), continuing to maintain a positive pressure of said inert gas within said contained enclosure while performing step (c), then discontinuing the flow of inert gas into said enclosure before oxidizing said fabric as set forth in step (d), thereby permitting oxygen to enter said contained enclosure before beginning the oxidation of said indigo dye on said fibers.

6. The method of dyeing fabric with indigo dye as defined in claim 1, wherein said method includes preparing said indigo dye liquor in a separate tank connected to said dye tank by a line, said method including placing water in said separate tank, then stripping oxygen from said water in said separate tank by adding sodium hydrosulfite to the water in said separate tank, then introducing the water stripped of oxygen to said dye tank through said line, thereby flushing oxygen from said line, then adding indigo in its reduced leuco state to the water in said separate tank.

7. The method of dyeing fabric with indigo dye as defined in claim 1, wherein said method includes introducing nitrogen gas under pressure into said contained enclosure of said piece dye machine while continuously moving said fabric into and out of the water in said dye tank within said contained enclosure for a period of time sufficient to displace oxygen from said contained enclosure and said fabric prior to introducing indigo dye liquor into said dye tank as set forth in step (c).

8. The method of dyeing fabric with indigo dye as defined in claim 1 wherein the oxidizing of step (d) is accomplished by flooding the fabric with water.

9. A method of dyeing fabric with indigo dye in a conventional piece dye machine, said piece dye machine including a dye tank within a contained enclosure and means for continuously moving the fabric to be dyed into and out of said dye tank within said enclosure, said method comprising the following steps:

(a) placing the fabric to be dyed in said dye tank of said piece dye machine and adding water to said dye tank to at least partially cover said fabric;

(b) introducing a non-oxidizing or inert gas under pressure into said contained enclosure of said piece dye machine displacing oxygen from said contained enclosure and creating an atmosphere within said enclosure which is substantially free of oxygen;

(c) introducing an indigo dye liquor containing indigo in its reduced leuco state into said dye tank and agitating said fabric within said contained enclosure while maintaining said enclosure substantially free of oxygen;

(d) draining said dye liquor from said dye tank; and (e) flooding said fabric with water containing oxygen, thereby oxidizing said indigo dye on said fabric and permanently dyeing said fabric.

10. The method of dyeing fabric with indigo dye as defined in claim 9, wherein said method includes agitating said fabric within said dye tank and lifting said fabric in said contained enclosure while introducing inert gas into said enclosure as set forth in step (b), thereby displacing oxygen from said contained enclosure and said fabric prior to introducing an indigo dye liquor into said dye tank as set forth in step (c).

11. The method of dyeing fabric with indigo dye as set forth in claim 10, wherein said method includes introducing nitrogen as said inert gas under pressure into said contained enclosure while agitating said fabric.

12. The method of dyeing fabric with indigo dye as defined in claim 9, wherein said method includes pretreating said fabric with a mordant prior to introducing inert gas into said contained enclosure.

13. The method of dyeing fabric with an indigo dye as defined in claim 12, wherein said mordant is an aqueous suspension of alum and soda ash.

14. The method of dyeing fabric with an indigo dye as defined in claim 13, wherein said pretreatment step includes premordanting said fabric by first introducing alum into said dye tank containing water and said fabric, then adding soda ash to said dye tank in a ratio of about 7 to 1 alum to soda ash in weight percent.

15. A method of dyeing yarn with indigo dye in a conventional package dye machine, said package dye machine including a perforated tube having the yarn to be dyed wound on said tube within a contained enclosure and means for pumping liquid under pressure into said perforated tube and through said yarn wound on said tube, said method comprising the following steps:

(a) introducing an inert gas under pressure into said contained enclosure displacing oxygen from said enclosure and creating a nonoxidizing atmosphere within said enclosure;

(b) pumping indigo dye liquor containing indigo in its reduced leuco state into said perforated tube and through said yarn wound on said tube, thereby causing said yarn to absorb said indigo dye while maintaining said nonoxidizing atmosphere within said contained enclosure surrounding said yarn; and (c) oxidizing said indigo aye on said yarn, thereby permanently dyeing said yarn.

16. The method of dyeing yarn with indigo dye in a package dye machine as defined in claim 15, wherein said method includes discontinuing the introduction of inert gas into said contained enclosure prior to oxidizing as set forth in step (c) for a period of time sufficient to permit oxygen to enter said contained enclosure and begin oxidation of said indigo dye.

17. A method of dyeing yarn with indigo dye in a package dye machine as defined in claim 15, wherein said indigo dye liquor is prepared in a separate tank connected to said machine by a line, said method including introducing water to said separate tank, then adding a reducing agent to said water in said separate tank, then pumping said water to said machine to purge oxygen from said line, then closing said line and introducing indigo in its reduced leuco state into said water in said machine.

18. The method of dyeing fabric with indigo dye as defined in claim 15 wherein the oxidizing of step (c) is accomplished by flooding the fabric with water.

19. The method of dyeing yarn with indigo dye as defined in claim 15, wherein said inert gas introduced in step (a) is nitrogen gas.

* * * * *